A. BARR & W. STROUD.
APPARATUS FOR THE CONVERSION OF MOTION ACCORDING TO ONE LAW INTO A MOTION ACCORDING TO ANOTHER LAW.
APPLICATION FILED JUNE 8, 1915.
1,159,463.
Patented Nov. 9, 1915.
2 SHEETS—SHEET 1.
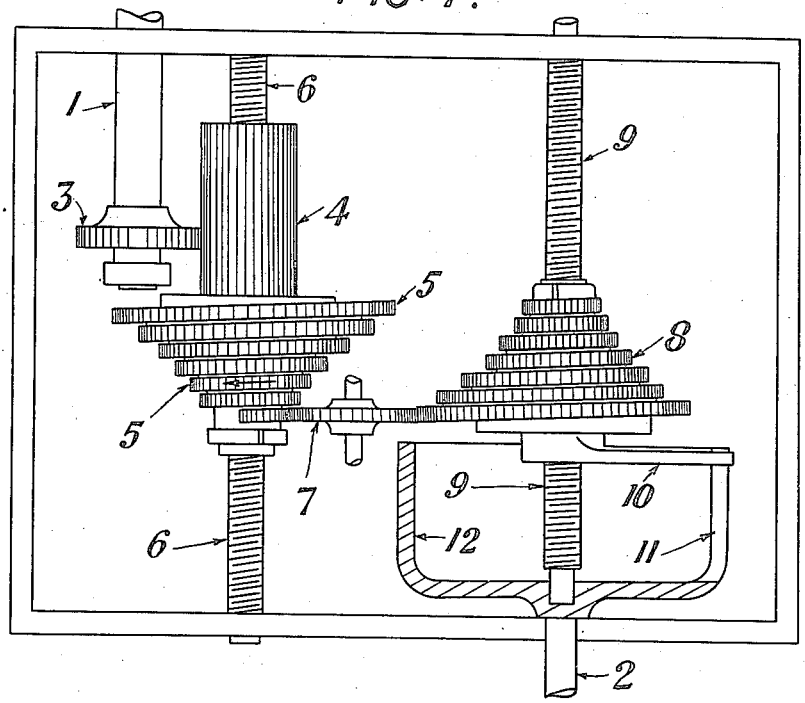
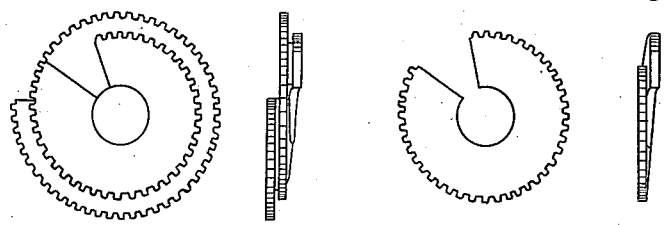
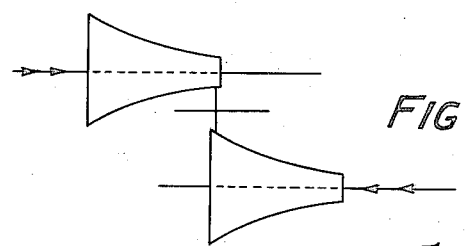
Inventors.
Archibald Barr.
William Stroud
By T. Walter Fowler
atty.

A. BARR & W. STROUD.
APPARATUS FOR THE CONVERSION OF MOTION ACCORDING TO ONE LAW INTO A MOTION ACCORDING TO ANOTHER LAW.
APPLICATION FILED JUNE 8, 1915.
1,159,463.
Patented Nov. 9, 1915.
2 SHEETS—SHEET 2.
FIG:7.
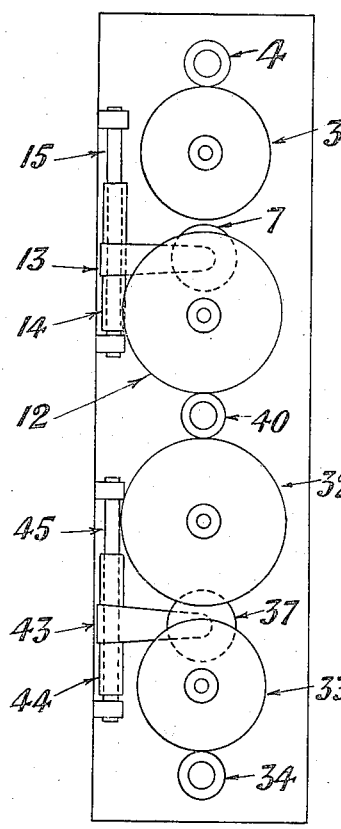
FIG:6.
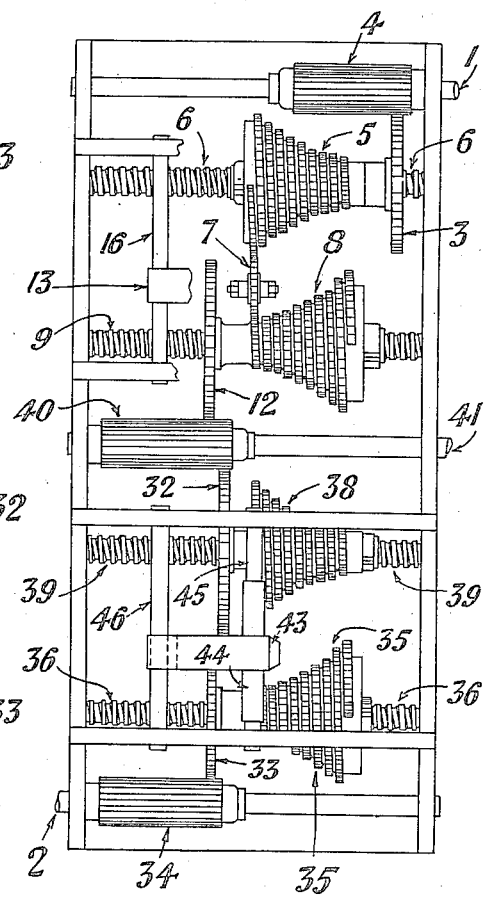
Inventors.
Archibald Barr.
William Stroud.
By T. Walter Fowler
atty.

UNITED STATES PATENT OFFICE.

ARCHIBALD BARR AND WILLIAM STROUD, OF ANNIESLAND, GLASGOW, SCOTLAND, ASSIGNORS TO BARR AND STROUD, LIMITED, OF GLASGOW, SCOTLAND.

APPARATUS FOR THE CONVERSION OF MOTION ACCORDING TO ONE LAW INTO A MOTION ACCORDING TO ANOTHER LAW.

1,159,463.     Specification of Letters Patent.     Patented Nov. 9, 1915.

Application filed June 8, 1915. Serial No. 32,988.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful Improvements in Apparatus for the Conversion of Motion According to One Law into a Motion According to Another Law, of which the following is a specification.

The object of our invention is to make provision for the conversion of motion according to one law into motion according to another law. For example, it provides means for the conversion of motions in accordance with those of the working head of a constant base rangefinder—which follow the reciprocal law with reference to changes of ranges—into motions proportional to the changes of range, *i. e.*, the conversion of motions according to a reciprocal scale into motions according to a uniform scale; or again, for the conversion of motions according to a uniform scale of ranges into motions corresponding to a scale of gunsight elevations corresponding to the ranges; or for other purposes.

In the simplest form of the invention we provide two toothed helico-spirals which we shall suppose oppositely directed and mounted with their axes parallel to each other, and we shall further assume, for simplicity, that the two spirals make an equal number of revolutions between the limits stated. Between the spirals transmission gear is provided which in one form consists of a pinion (whose axis is capable of motion as subsequently explained) arranged to gear simultaneously with the two.

The spirals can be constructed in a large number of ways, but in order to make it possible to fix the axes of the two spirals at a constant distance apart, and, in adopting transmission gear consisting of a single pinion, to enable the pinion to be accommodated on an axis in the same plane as the axes of the spirals, we may so construct the spirals that the sum of the pitch radii at teeth simultaneously in gear with the pinion is constant. When this further condition is fulfilled the two spirals may be made identical with each other, but oppositely directed as previously stated.

It is convenient to construct the spirals with a uniform axial pitch, and in that case we may mount each spiral upon a stationary screw, (or otherwise arrange that it will have an axial motion in proportion to its rotational motion) in which case the pinion need not have any motion in the direction of its axis. It will, however, require to move in a direction perpendicular to the axes of the spirals, and this we may provide for by mounting the pinion upon a carriage moving upon guides placed at right angles to the axes of the spirals. Separate provision may be made for moving the pinion carriage on its guides in the required manner, or the motion may be accomplished simply by the contact of the pinion with the spirals.

In some cases it may be inconvenient to use spirals with so large a ratio of pitch radii as would be required in the mechanism as above described. In such cases we may accomplish the conversion of motion in the general manner above described but in two (or more) stages. Thus, for example, we may provide four toothed helico-spirals, the first of which drives the second through a pinion as above described, the third may be attached to or geared by circular wheels to the second, and drive the fourth through a pinion in the same manner as the second is driven by the first. The spirals which are to move in accordance with the original and final motions may, by means of toothed wheels, or otherwise, be geared, the one to the working head of a rangefinder, while the other operates a mechanism indicating the range by equal steps, or drives any other mechanism that it is desired to move according to ranges upon a uniform scale.

We do not confine ourselves to the particular case in which the sum of the radii, to teeth that are in simultaneous action, is constant. We may use spirals which do not comply with this condition, and provide a pinion that has a motion at right angles to the plane containing the axes of the spirals. Again, we may use transmission gear consisting of two or more wheels as intermediaries between one spiral and another which it is to drive.

Further, we do not confine ourselves to the particular apparatus which we have taken by way of illustration; the invention is applicable to other cases of the conversion of motion according to one law into motion according to another law. Nor do we confine ourselves, when we make the conversion in two stages, to making those two steps by means of similar gearing. We may, for example, provide a mechanism embodying four (or more) spirals for the conversion of motion according to a reciprocal scale of ranges into motion corresponding to gunsight elevations in two stages, the first step in the conversion being from the reciprocal scale to a uniform scale, and the second from a uniform scale to the gunsight scale.

We may construct the spirals in a variety of ways. For example, we may construct a toothless helico-spiral and wrap upon it a suitably cut toothed rack, or we may construct each spiral in toothed sections of one round or less and build these together to form the complete spiral.

Some examples of construction of apparatus according to this invention will now be described with reference to the accompanying drawings, in which—

Figure 1 shows a view looking from above of an arrangement embodying two spiral gears and one pinion transmission gear wheel. Figs. 2, 3, 4 and 5 refer to one method of construction for the spiral gear. Figs. 6 and 7 show a view looking from above and from the side respectively of an arrangement in which two pairs of spiral gears and single pinion transmission gear wheels are embodied. Fig. 8 is a diagrammatic illustration of a modification.

In Fig. 1, 1 and 2 are the two shafts whose velocity ratio requires to be different at different places. Upon shaft 1 is fixed a spur wheel 3 gearing into a spur pinion 4 of appropriate axial length. Fixed to 4 is one of the toothed helico-spiral gears 5, in gear with which there is a transmission pinion 7. The parts 4 and 5 are mounted as a nut upon the stationary screw 6 whose pitch is made equal to the pitch of the successive turns of the spiral in the gear 5. In this way, as the shaft 1 is rotated the parts 4 and 5 are simultaneously rotated and axially translated so that no axial motion of the pinion 7 is required to keep the teeth of 5 and 7 in mesh though of course a motion of 7 at right angles to its axis must be allowed for. The pinion 7 gears with a second helico-spiral gear 8 mounted as a nut upon a stationary screw 9, the pitch of the screw being equal to the pitch of the spiral as before. The rotation of the spiral gear 8 might have been communicated to the shaft 2 by means similar to the parts 3 and 4 shown in connection with shaft 1, but for the sake of variety the spiral gear 8 is shown with an arm 10 movable in a longitudinal slot 11 in the bell shaped piece 12 fixed to the shaft 2.

In the position shown in the figure a small rotation of the helico-spiral 5 will be associated with a much smaller rotation of the helico-spiral 8, but as 5 is further rotated in the direction of the arrow, the radial distance of the teeth in mesh between 5 and 7 gradually increases, while the corresponding radial distance of the teeth in mesh between 7 and 8 gradually diminishes, the pinion wheel 7 meantime being gradually pushed to the right—so that after a few complete revolutions of the spiral 5 the velocity-ratio of the spirals 5 and 8 will become equal, and after the spiral 5 has made further revolutions from the position shown in the figure, a small rotation of the spiral 5 will be associated with a much larger rotation of the spiral 8.

The mounting of the pinion and the provision for its transverse motion are omitted in this figure for clearness in the drawing. It will be evident that we may interpose transmission gear consisting of two or more toothed wheels between the spirals. Thus, for example, we may use two wheels gearing together and each gearing with one of the spirals, when it is desired that the spirals should revolve in opposite directions.

In Figs. 6 and 7 the arrangement shown in Fig. 1 is practically duplicated with a few slight modifications, e. g., the long pinion 4 is attached to the shaft 1 in Fig. 6, and the toothed wheel 3 to the spiral 5. In the lower part of the figure the parts 32, 33, 34, 35, 36, 37, 38, 39, correspond to the parts 12, 3, 4, 5, 6, 7, 8, 9, in the upper part. The two sets of mechanism are geared together by the pinion rod 40 upon the shaft 41 to which the handle operating the gear may conveniently be attached. This arrangement has the advantage that any "lost motion" between the gears is more or less compensated for in the final motion, whereas if one end member of the gearing is directly driven the "lost motions" are added together in the final resulting motions.

43 is a carriage, in which the pinion 37 is mounted, provided with a sleeve 44, which slides on a guide rod 45. The carriage is provided with an arm which is forked upon another guide rod 46, so as to prevent it rotating about the guide rod 45. The corresponding parts 13, 14, 15 and 16 for the pinion 7 are only partially shown for clearness. In other respects the same numbers are used to indicate the same or like parts where these occur as in the part of the description referring to Fig. 1.

In Fig. 7 the helico-spiral gears are for simplicity not represented, but their character is sufficiently shown in Fig. 4. Suppose now the pinion rod 40 is turned through a small angle, then in the position shown in the figure the shaft 1 will be turned through a much smaller angle while the shaft 2 will be turned through a much larger angle.

Although we have described the two members of a pair of spiral gears as being oppositely directed, as shown in Fig. 1, we can arrange them to be similarly directed, as shown in Fig. 8 diagrammatically, in which case the toothed helico-spiral members are, for example, mounted upon right handed and left handed screws respectively. In this and in the other forms illustrated it will be observed that in the simultaneous axial motion of two helico-spiral members, one moves in the direction of its apex while the other moves in the direction of its base.

In Figs. 2 and 3 we illustrate one method of constructing an element of the spiral gear. Metal blanks are first bent or stamped as shown in Fig. 3, after which the appropriate form is given to the periphery, and then the teeth are cut. Each element may conveniently be made so as to embrace an interval corresponding to an integral number of teeth and embracing an angle somewhat less than 360°.

Figs. 4 and 5 show how the successive elements are assembled together. Suitably bent disks or partial disks may be placed between the segments so as to separate them as illustrated, see Figs. 1, 5 and 6.

We claim:—

1. Apparatus consisting of two toothed helico-spiral members, transmission toothed gear adapted to simultaneously mesh with teeth of the two members, and means for so maintaining the gears in mesh that when in action teeth on progressively increasing radii of one and teeth on progressively decreasing radii of the other member engage with the teeth of the transmission gear, for the purposes set forth.

2. Apparatus consisting of two toothed helico-spiral members mounted to rotate about axes parallel to one another, transmission toothed gear adapted to simultaneously mesh with teeth of the two members, and means for so maintaining the gears in mesh that when in action teeth on progressively increasing radii of one and teeth on progressively decreasing radii of the other member engage with the teeth of the transmission gear, for the purposes set forth.

3. Apparatus consisting of two toothed helico-spiral members, transmission toothed gear adapted to simultaneously mesh with teeth of the two members and capable of motion toward and away from each of the said axes, and means for so maintaining the gears in mesh that when in action teeth on progressively increasing radii of one and teeth on progressively decreasing radii of the other member engage with the teeth of the transmission gear, for the purposes set forth.

4. Apparatus consisting of two toothed helico-spiral members, transmission toothed gear consisting of a single pinion adapted to simultaneously mesh with teeth of the two members, means for so maintaining the gears in mesh that teeth on progressively increasing radii of one and teeth on progressively decreasing radii of the other member engage with the teeth of the pinion, for the purposes set forth.

5. Apparatus consisting of two toothed helico-spiral members oppositely directed, transmission toothed gear adapted to simultaneously mesh with teeth of the two members, and means for so maintaining the gears in mesh that when in action teeth on progressively increasing radii of one and teeth on progressively decreasing radii of the other member engage with the teeth of the transmission gear, for the purposes set forth.

6. Apparatus consisting of two toothed helico-spiral members oppositely directed and mounted to rotate about axes parallel to one another, transmission toothed gear adapted to simultaneously mesh with teeth of the two members, and means for so maintaining the gears in mesh that when in action teeth on progressively increasing radii of one and teeth on progressively decreasing radii of the other member engage with the teeth of the transmission gear, for the purposes set forth.

7. Apparatus consisting of two toothed helico-spiral members, transmission toothed gear adapted to simultaneously mesh with teeth of the two members, and means for so maintaining the gear in mesh that when in action teeth on progressively increasing radii of one and teeth on progressively decreasing radii of the other member engage with the teeth of the transmission gear, the toothed helico-spiral members being formed and the gears in mesh maintained so that the sum of the pitch radii at teeth simultaneously in gear with the transmission toothed gear is constant, for the purposes set forth.

8. Apparatus consisting of two pairs of toothed helico-spiral members, the first pair consisting of a first and a second member, the second pair of a third and fourth member, two transmission toothed gears, one for each pair of members adapted to simultaneously mesh with teeth of the two members of its respective pair, means for causing the second and third member to rotate together and means for so maintaining the gears in mesh that when in action teeth on progressively increasing radii of one and teeth on progressively decreasing radii of the other member of each pair engage with the teeth of its respective transmission toothed gear, for the purposes set forth.

9. Apparatus consisting of two toothed helico-spiral members, transmission toothed gear adapted to simultaneously mesh with teeth of the two members, means for preventing the transmission toothed gear from moving in the direction of its axis of rotation, means for moving the members in the direction of their respective axes of rotation simultaneously, one in the direction of its apex the other in the direction of its base, and means for so maintaining the gears in mesh that when in action teeth on progressively increasing radii of one and teeth on progressively decreasing radii of the other member engage with teeth of the transmission gear, for the purposes set forth.

10. Apparatus consisting of two toothed helico-spiral members, transmission toothed gear adapted to simultaneously mesh with teeth of the two members, means for preventing the transmission toothed gear from moving in the direction of its axis of rotation, screws for moving the members in the direction of their respective axes of rotation simultaneously, one in the direction of its apex the other in the direction of its base, and means for so maintaining the gears in mesh that when in action teeth on progressively increasing radii of one and teeth on progressively decreasing radii of the other member engage with teeth of the transmission gear, for the purposes set forth.

ARCHIBALD BARR.
WILLIAM STROUD.

Witnesses:
ARLINE DAVIES,
OSWIN EDWIN HOWARD BIRCHALL.